United States Patent [19]

Gabel et al.

[11] 4,167,592

[45] Sep. 11, 1979

[54] METHOD OF MARKING A LINE ALONG A ROADWAY

[75] Inventors: Lorne G. Gabel; Garry E. Paulson; Thomas G. Kirk, all of Saskatoon, Canada

[73] Assignee: Her Majesty the Queen in Right of the Province of Saskatchewan, Regina, Canada

[21] Appl. No.: 802,502

[22] Filed: Jun. 1, 1977

[51] Int. Cl.² .......................... B05C 1/16; E01C 5/00
[52] U.S. Cl. .................................... 427/137; 239/150
[58] Field of Search ............... 427/137, 286; 239/150, 239/151

[56] References Cited
U.S. PATENT DOCUMENTS 3,101,175  8/1963  Brown ................................. 239/150
3,882,268  5/1975  Ogawa et al. ....................... 239/150

Primary Examiner—Ronald H. Smith
Assistant Examiner—Sadie L. Childs

[57] ABSTRACT

A method and apparatus for marking a line, such as the centerline, along a roadway, using a vehicle carrying paint marking apparatus, in which a pair of television cameras, one mounted on each side of the vehicle, view the edges of the roadway and project the images onto a split screen. By keeping the images on the screen in a predetermined relationship the operator can steer the vehicle in a path along the roadway uniformly spaced from its edges. Preferably a third camera, centrally located on the vehicle, views the vanishing point of the roadway when straight and the image of the vanishing point is registered with a predetermined mark associated with the screen.

8 Claims, 5 Drawing Figures

METHOD OF MARKING A LINE ALONG A ROADWAY

This invention relates to the painting of lines, usually centrelines, along asphalt or macadam highways.

Before painting a line, such as a centreline, along a roadway the locus of the line must be established and conventionally this is done by using surveying techniques to paint small marks or "premarks" at periodic intervals along the roadway. The premarks serve as guides to the operator of a "striping" truck which paints the final line. Such a system is both time consuming and costly in labour.

It is an object of the present invention to provide an improved system for premarking or marking roadways which is faster and more economical than systems now in use. This is achieved by continuously monitoring the position of a marking vehicle on the roadway which enables the operator of the vehicle to keep a uniform path along the road.

Essentially the invention consists of a method of marking a line along a roadway using a vehicle carrying marking apparatus, comprising the steps of: continuously monitoring, by means of at least two television cameras mounted on the vehicle, the edges of the roadway as the vehicle moves forwardly; arranging the images of the edges of the roadway in a predetermined relationship on a television screen when the vehicle is in a predetermined location with respect to the edges of the roadway and, maintaining the images in said predetermined relationship on the screen while marking the roadway, the images of the edges of the roadway being oriented to converge. Preferably a pair of cameras are mounted on the vehicle equispaced one on each side of the vehicle and the edges of the roadway forwardly of the vehicle are monitored and arranged symmetrically on the screen. Preferably also a third camera is mounted centrally on the vehicle to monitor the vanishing point of the roadway and the image of the point is kept in a predetermined position on a television screen on the vehicle while it moves forwardly to mark the roadway.

The invention also resides in an apparatus for marking a line along a roadway using a vehicle carrying marking apparatus, comprising: a first pair of television cameras mounted on the vehicle and arranged to monitor the edges of the roadway; a television screen mounted on the vehicle; and means to arrange the images of the edges of the roadway on the screen in a predetermined relationship when the vehicle is in a predetermined location with respect to the edges of the roadway. Again, it is preferable to have a third television camera centrally mounted on the vehicle to monitor the vanishing point of the roadway and a screen on which the image of the vanishing point may be shown.

For marking curved portions of the roadway the system preferably includes a second pair of television cameras mounted on the vehicle rearwardly of the first pair of cameras. When the vehicle enters a curve the images on the screen from the first pair of cameras are switched off and the images from the second pair of cameras are switched on. The accuracy of the markings is further improved by having two sets of marking applicators, one at the front of the vehicle and one at the rear of the vehicle, the rear applicator being used in conjunction with the operation of the front pair of cameras and the front applicator being used in conjunction with the operation of the rear pair of cameras.

An example embodiment of the invention is shown in the accompanying drawings in which.

Figure 1:
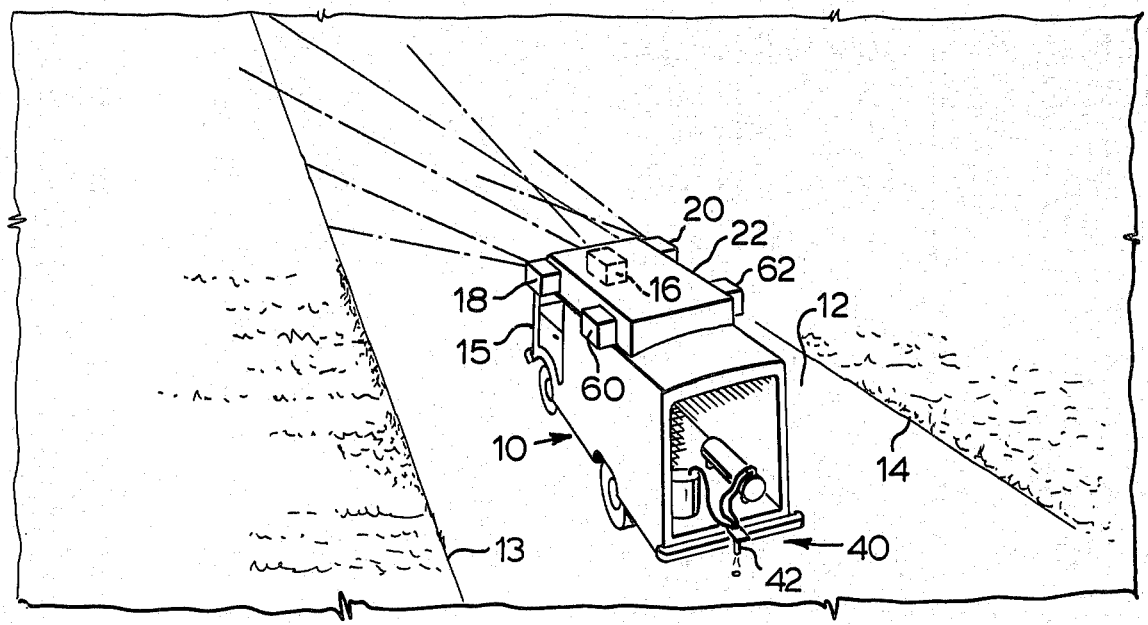
FIG. 1 is a perspective view of a vehicle of the invention premarking a straight roadway.

The example embodiment of the drawings shows a vehicle 10, suitably an automotive vehicle such as a truck, which travels along a roadway 12 having edges 13 and 14. Three television cameras are mounted on the roof of truck 10 adjacent the front end 15 of the vehicle. One camera 16 is mounted in fixed position centrally on truck 10 to view roadway 12 directly ahead of the vehicle 10 including the vanishing point. The other two cameras 18 and 20 are mounted in fixed position equispaced one on each side of the vehicle to view forwardly and laterally of the vehicle. Cameras 16, 18 and 20 are protected by a cowling 22.

Figure 2:
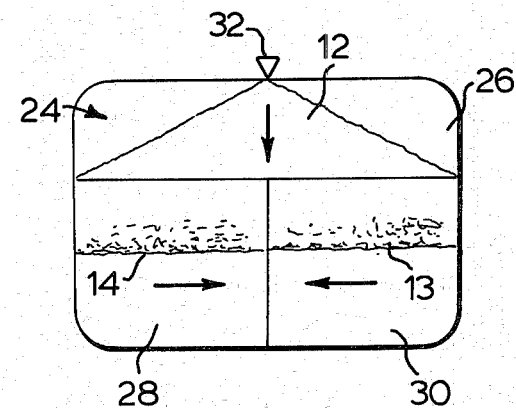
FIG. 2 is a schematic diagram of the screen of the invention carried by the vehicle of FIG. 1.
Figure 4:
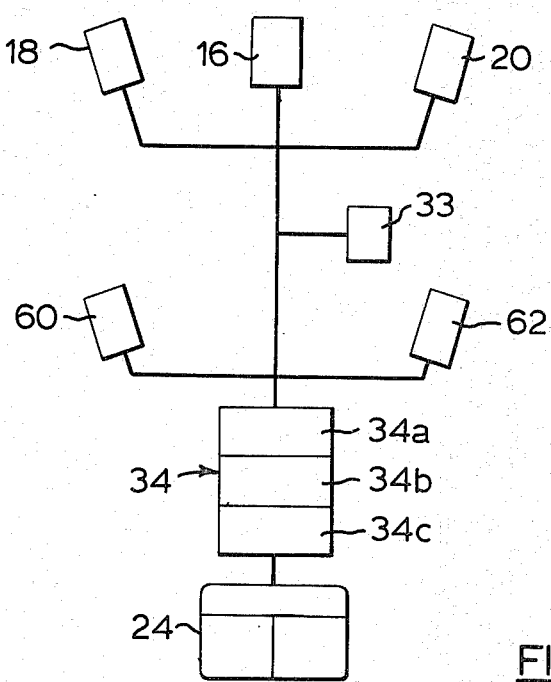
FIG. 4 is a schematic diagram of the video control system of the invention.

As seen in FIG. 2 the images of cameras 16, 18 and 20 are projected on a screen 24 carried within vehicle 10. Screen 24 is divided into three portions, an upper area 26 occupying the upper portion of the screen and two equal areas 28 and 30 occupying the lower portion of the screen in side-by-side relationship. An indicator 32 marks the centre of the upper margin of area 26. Preferably screen 24 is mounted on the dashboard of the vehicle in front of the steering wheel. The continuous views received by cameras 16, 18 and 20, checked by a monitor 33, are fed into a video switcher 34, as shown schematically in FIG. 4, which projects them one onto each area 26, 28 and 30 of screen 24. Video switcher 34 incorporates a screen splitter 34a, a synchronous generator 34b and an inverter 34c. The view from central camera 16 is projected onto area 26 with the vanishing point of roadway 12 registering with indicator 32 when vehicle 10 is proceeding along a predetermined path on roadway 12 with respect to edges 13 and 14. The views from side cameras 18 and 20 are projected onto areas 30 and 28 respectively whereby the images of the edges 13 and 14 of roadway 12 are aligned when vehicle 10 is moving forwardly along the centre of the roadway.

Figure 5:
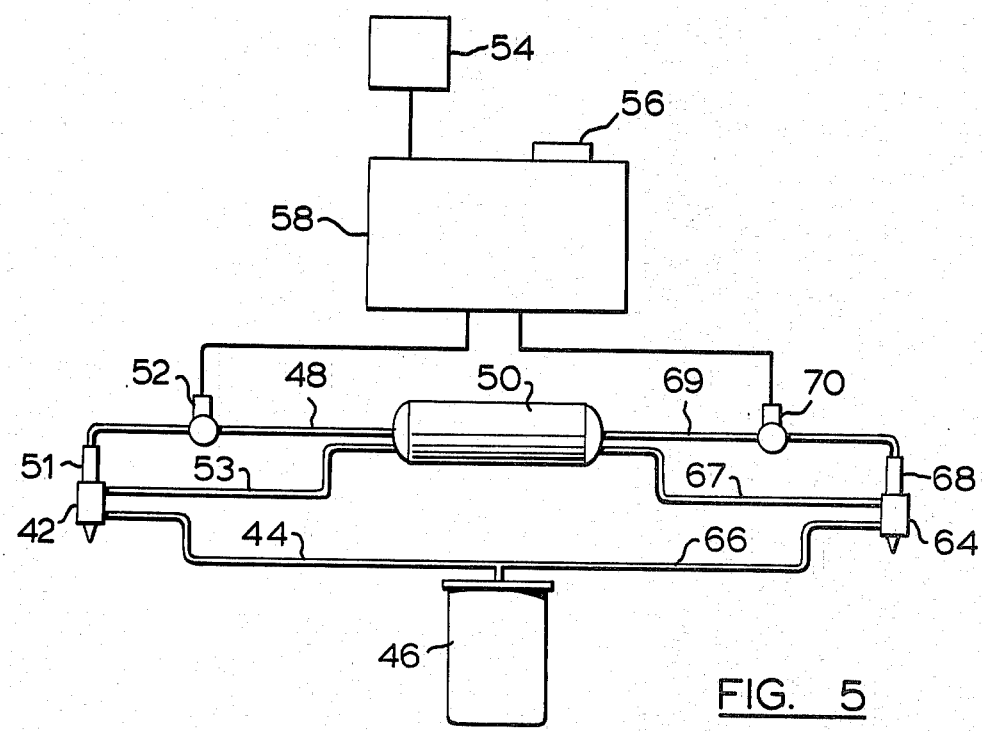
FIG. 5 is a schematic diagram of the paint control system of the invention.

Vehicle 10 carries a paint applicator mechanism 40 of conventional construction for applying markings to roadway 12. Applicator 40 comprises a downwardly projecting spray nozzle 42 clamped centrally at the rear end of the vehicle. As indicated schematically in FIG. 5, nozzle 42 is suitably connected by one hose 44 to a paint reservoir 46. A second hose 48 provides air pressure from a tank 50 to an air cylinder 51 which is connected to nozzle 42 to open and close the nozzle, and a solenoid valve 52 is located in air hose 48. A third hose 53 connects tank 50 with nozzle 42. Reservoir 46 and tank 50 are carried by vehicle 10. As seen schematically in FIG. 5, the spacing between premarks is controlled by two signals. An optical coupler 54 attached to the speedometer cable of vehicle 10 provides a pulse output having a frequency proportional to the speed. A pair of thumb wheel switches 56 calibrated in feet are set by the operator to the desired premarked spacing. Both optical coupler 54 and switches 56 are fed into an electrical panel 58 which controls solenoid valve 52.

In the apparatus of the example embodiment described above, cameras 18 and 20 are preferably mounted about eight feet apart, and about eight feet above ground level. Central camera 16 is mounted about seven feet above ground level. Medium wide-angle lenses are used in each of the side cameras and telephoto lenses are used in the center camera. Optimum results are achieved by viewing the edges of the roadway, with cameras 18 and 20, approximately thirty feet ahead of the vehicle to give reasonably distinct images which do not move across screen 24 too quickly.

To operate the described apparatus, vehicle 10 travels centrally along roadway 12 at a speed of about ten miles an hour. The driver of vehicle 10 continuously observes screen 24, keeping the vanishing point of roadway 12 in upper area 26 registering with indicator 32 and at the same time keeping the images of the converging edges of the roadway colinear as seen in FIG. 2. While this orientation of the images on the screen is maintained, paint applicator 40 is activated. For premarking a roadway, intermittent activation of applicator 40 will provide spaced markings which can be followed later by a paint striping truck. By setting switches 56 to the desired spacing, the activation of optical coupler 54 will cause control panel 58 to open solenoid valve 52 momentarily at prescribed intervals.

Figure 3:
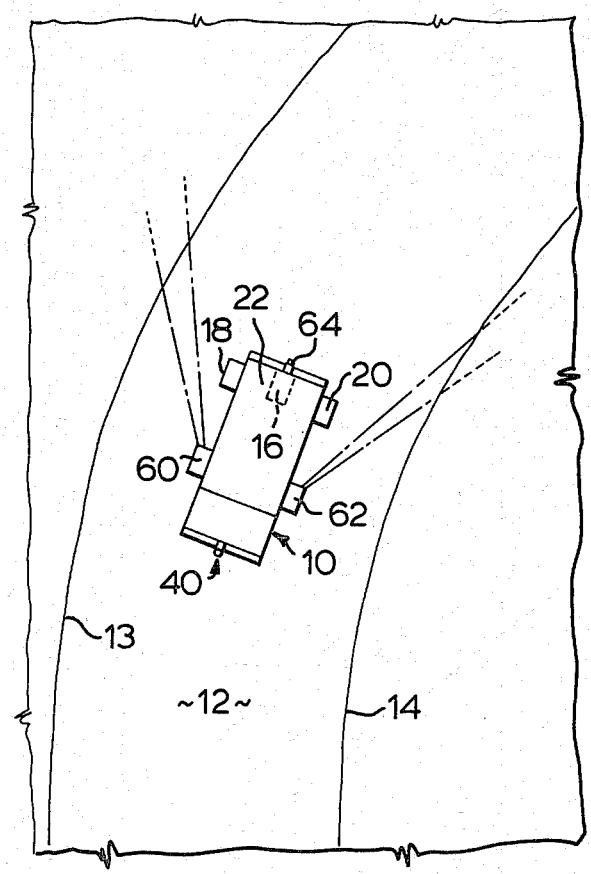
FIG. 3 is a perspective view of the vehicle of FIG. 1 premarking a curved roadway.

Because applicator 40 mounted on the rear of vehicle 10 tends to mark in a shorter radius than the centreline of the roadway on curves, it is advantageous to provide a second pair of side cameras and a second, front mounted applicator for use in premarking curved sections of the roadway. The example embodiment includes a second pair of television cameras 60 and 62 mounted on the roof of vehicle 10 within cowling 22. Cameras 60 and 62 are fixed rearwardly as cameras 18 and 20, equispaced one on each side of the centreline of vehicle 10 and arranged to view forwardly and laterally of the vehicle. A second, downwardly projecting spray nozzle 64 of the same construction as nozzle 42 is fixed centrally at the front end of vehicle 10 and suitably connected by a hose 66 to paint reservoir 46 and by a hose 67 to air pressure tank 50. An air cylinder 68 is connected to nozzle 64 to open and close the nozzle, and an air hose 69 connects tank 50 with cylinder 68. A solenoid valve 70 is located in air hose 68. Cameras 60 and 62 are mounted at the same height and spaced apart at the same distance as cameras 18 and 20 and they are directed to monitor the side edges of roadway 12 in the area adjacent the front end of vehicle 10. Of course all cameras 16, 18, 20, 60 and 62 are adjustably mounted on vehicle 10 and clamped in fixed positions. When a curve in roadway 12 is approached by vehicle 10, as seen in FIG. 3, the operator of vehicle 10 switches the control mechanism to operate rear side cameras 60 and 62 instead of front cameras 18 and 20, and to operate front spray nozzle 64 instead of rear spray nozzle 42. The operator then guides vehicle 10 in the same manner as previously described but without the benefit of a vanishing point seen through camera 16. When the curve has been completed the operator again switches the control mechanism to operate front side cameras 18 and 20 and rear spray nozzle 42 as previously described.

To maintain uniform spacing between premarkings during the switchover from front cameras 18 and 20 to rear cameras 60 and 62, and vice versa, the control also compensates for front-rear separation of nozzles 42 and 64. For example if the spacing of the premarks is set at sixty feet and the separation between nozzles 42 and 64 is twenty feet then when the control is switched from front cameras 18 and 20 to rear cameras 60 and 62 on entering a curve in roadway 12 rear nozzle 42 will continue in operation to paint the first premark on the curve if vehicle 10 has travelled more than forty feet from the previous premark, after which the control system will switch from the rear to front paint applicator for subsequent premarks in the curve mode.

Colour cameras may have been found preferable because they present a more distinct definition of the edges of the roadway and it is less tiring on the eyes of the operator. In this respect also, viewing of the edges of the roadway too close to the vehicle causes the images to move too rapidly across the screen while viewing of the edges too far ahead of the vehicle results in decreased accuracy in marking the roadway.

Using the method and apparatus of the present invention it has been found that the use of two side cameras 18 and 20 gives an accuracy of plus or minus six inches in marking the centreline of the roadway while the addition of central camera 16 increases the accuracy to plus or minus four inches.

It will be appreciated that the electronic equipment required to construct the apparatus of the invention and to perform the method of the invention is commercially available. Particular components used in constructing and operating a prototype of the invention were as follows:

| Part | Quantity | Make | Model |
| --- | --- | --- | --- |
| TV cameras | 5 | Audiotronics | PVC-818 |
| monitor | 1 | Sony | CVM |
| screen splitter | 2 | Tel | SS-221 |
| inverter | 1 | Topaz | 250-CZ-12/24 |
| synchronous generator | 1 | Shintron | — |

The paint spraying apparatus is standard in the field.

While premarking apparatus has been described in the example embodiment it will be appreciated that the invention is equally applicable for marking or striping a roadway. Also spray nozzles 42 and 64 may be offset laterally from the centreline of vehicle 10 with suitable realignment of the television cameras.

We claim:

1. A method of marking a line along a roadway using a vehicle carrying paint-marking apparatus, comprising the steps of:
   continuously monitoring, by means of a first pair of television cameras mounted on the vehicle one on each side thereof, the edges of the roadway forwardly of the vehicle as the vehicle moves forwardly on a straight roadway;
   continuously monitoring, by means of a second pair of television cameras mounted on the vehicle rearwardly of said first pair of cameras one on each side of the vehicle, the edges of the roadway adjacent the vehicle as a vehicle moves forwardly on a curved roadway;
   arranging the images of the edges of the roadway, selectively, from said first pair of cameras or said second pair of cameras, in a predetermined relationship on a television screen when the vehicle is in a predetermined location with respect to the edges of the roadway and maintaining said images in said predetermined relationship on the screen while marking the roadway, the images of the edges of the roadway being oriented to converge; and marking the roadway rearwardly of the vehicle where the roadway is straight and forwardly of the vehicle where the roadway is curved.

2. A method as claimed in claim 1 including the additional step of monitoring the vanishing point of the roadway ahead of the vehicle and maintaining the image of said point in a predetermined position on a television screen while marking the roadway.

3. A method as claimed in claim 1 in which the images of the edges of the roadway are maintained in colinear relationship.

4. A method as claimed in 1 in which the continuous travel of the images of the roadway is towards their point of convergence.

5. A method as claimed in claim 1 in which the images of the edges of the roadway and the vanishing point thereof are projected onto a single screen divided into an upper portion and a lower portion, the upper portion carrying the image of the third camera and the lower portion being split to carry the images of the pair of cameras.

6. A method of marking the centreline of a roadway, comprising the steps of:

moving a vehicle along a roadway;

continuously viewing, by means of a first pair of television cameras mounted on the vehicle and equispaced one on each side thereof, the opposed edges of the roadway forwardly of the vehicle;

projecting the images from said first pair of cameras simultaneously on the screen mounted on the vehicle, the images being located on the screen in side-by-side relationship;

maintaining the images of the edges of the roadway in symmetrical arrangement on the screen by steering the vehicle centrally along the roadway;

applying markings, by means mounted on the vehicle, centrally along the roadway to indicate the centreline thereof;

the images of the edges of the roadway being oriented to converge; and including A third television camera mounted on the vehicle viewing directly forwardly thereof, projecting the image therefrom on a screen, and maintaining the image of the vanishing point of the roadway centrally thereon by steering the vehicle centrally along the roadway.

7. A method as claimed in claim 6 in which the images of the edges of the roadway and the vanishing point thereof are projected onto a single screen divided into an upper portion and a lower portion, the upper portion carrying the image of the third camera and the lower portion being split to carry the images of the pair of cameras.

8. A method of marking the centreline of a roadway, comprising the steps of:

moving a vehicle along a roadway;

continuously viewing, by means of a first pair of television cameras mounted on the vehicle and equispaced one on each side thereof, the opposed edges of the roadway forwardly of the vehicle;

projecting the images from said first pair of cameras simultaneously on the screen mounted on the vehicle, the images being located on the screen in side-by-side relationship;

maintaining the images of the edges of the roadway in symmetrical arrangement on the screen by steering the vehicle centrally along the roadway; and applying markings, by means mounted on the vehicle, centrally along the roadway to indicate the centreline thereof;

the images of the edges of the roadway being oriented to converge; and the first pair of cameras being directed to monitor the edges of the roadway approximately thirty feet ahead of the vehicle when the roadway is straight, the cameras also including a second pair of cameras, the first pair of cameras being mounted forwardly on the vehicle and the second pair of cameras being mounted on the vehicle rearwardly of said first pair of cameras, the second pair of cameras being directed to monitor the edges of the roadway adjacent the front end of the vehicle.

* * * * *